Figure 1:
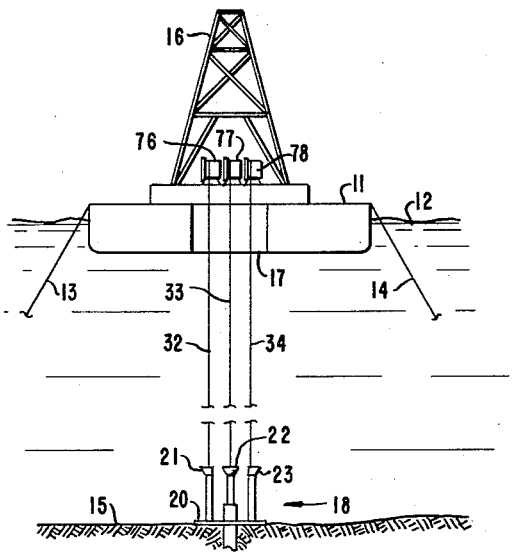

Dec. 29, 1964  W. J. HAYES  3,163,228
CABLE LATCHING DEVICE
Filed Nov. 6, 1961

INVENTOR:
W. J. HAYES

BY: J. H. McCarthy
HIS AGENT

United States Patent Office 3,163,228
Patented Dec. 29, 1964

3,163,228
CABLE LATCHING DEVICE
William J. Hayes, Torrance, Calif., assignor to Shell Oil Company, New York, N.Y., a corporation of Delaware
Filed Nov. 6, 1961, Ser. No. 150,430
3 Claims. (Cl. 166—214)

This invention relates to the carrying out of operations underwater and pertains more particularly to apparatus for guiding and aligning equipment through the water to a predetermined base of any suitable type, such as, for example, an offshore well which has been drilled and completed at a point adjacent the ocean floor.

Oil and gas wells drilled at offshore locations in waters over 100 feet or so in depth are preferably completed on the ocean floor with operations being carried out remotely from a drilling barge floating on the surface of the water. Since various pieces of equipment have to be lowered from the drilling barge to the ocean floor and must be accurately aligned at a predetermined position thereon from time to time, it is essential that apparatus be provided for guiding equipment of this type into place. One type of a guide system which has been used for drilling core holes in the ocean floor is shown and described in U.S. Patent 2,808,230 to McNeill.

In presently known systems the guide lines extend from a floating vessel on the surface of the water to a base positioned on the ocean floor when they are fixedly secured. After drilling a dry well which has to be abandoned, it has been the practice of running a wire cutter to the bottom along each cable to sever the cable near the ocean floor. Afterwards, the loose cables would be pulled up to the floating vessel. For wells that were being produced, it was generally planned to connect the cables together and drop them to the ocean floor from which they would later be recovered by dragging operations. Alternatively, the upper ends of the cables could be connected to a float marker from which they could be readily disconnected when it was desired to carry out operations again at the wellhead. Handling of guide cables in this manner may be unsatisfactory at times due to the fact that the slack cables can become tangled with each other or with the anchor of some vessel. Additionally, cables attached to a float are a hazard to navigation.

It is therefore a primary object of the present invention to provide a guide cable system adapted to extend between the floating vessel and the surface of a body of water and the ocean floor, which guide cable system is adapted to be readily disconnected from a base on the ocean floor by remote operations.

A further object of the present invention is to provide a guide cable system for use at a wellhead on the ocean floor wherein the lower end of the guide cables can be readily disconnected remotely from the base on the ocean floor and subsequently reinstalled therein by remote operations.

Figure 3:
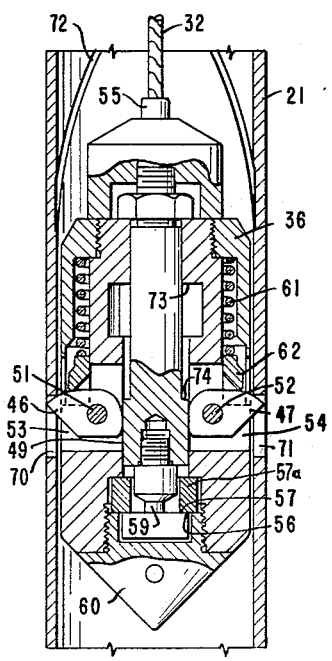
Figure 2:
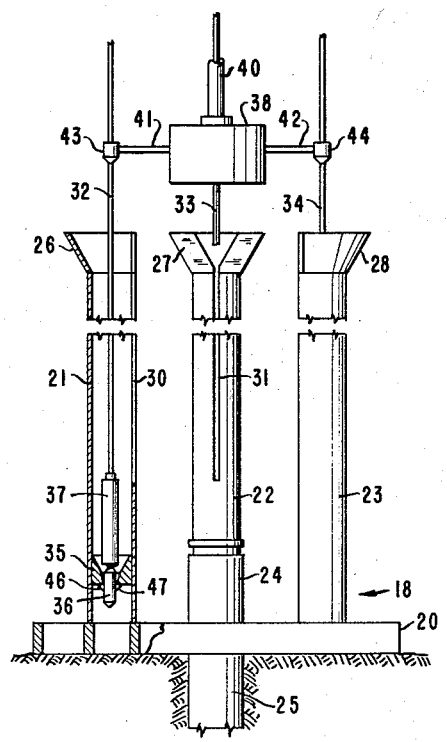

These and other objects of this invention will be understood from the following description taken with reference to the drawing, wherein, FIGURE 1 is a diagrammatic view illustrating a floating drilling barge anchored over a drilling location with guide cables extending from the barge to a guide base on the ocean floor;

FIGURE 2 is a diagrammatic view illustrating, in enlarged detail, a guide base on the ocean floor with a piece of equipment being lowered down the guide cables; and, FIGURE 3 is a view taken in cross-section of one form of a latching means for securing the guide cables to the guide base on the ocean floor.

Referring to FIGURE 1 of the drawing, a drilling barge or other vessel 11 of any suitable floatable type is illustrated as floating on the surface of a body of water 12 and substantially and fixedly positioned above a preselected drilling location, as by being anchored to the ocean floor by anchoring lines 13 and 14 to which anchors (not shown) are attached and sunk in the ocean floor 15. Equipment of this type may be used when carrying on well drilling operations in water varying from about 100 feet to 1500 feet or more.

The barge 11 is equipped with a suitable derrick 16 as well as other auxiliary equipment needed for drilling a well. The derrick 16 is positioned over a drilling slot or well 17 which extends vertically through the barge in a conventional manner. When using the equipment of the present invention the slot 16 in the barge 11 may be either centrally located or extend in from one edge. However, drilling operations may be carried out over the side of the barge without use of a slot.

Positioned on the ocean floor 15 directly under the slot 17 on the barge 11 is a wellhead support structure or guide assembly base 18. As shown in FIGURE 2, the guide assembly base 18 comprises a base member 20 to which two or more vertical guide columns 21, 22 and 23 are fixedly secured in any suitable manner, as by welding. The base member 20 may be of any suitable design, as by an arrangement of interconnecting and reinforced cross members covering an area sufficient to make a stable base for equipment on the ocean floor. If desired, the base member 20 may be cemented on the ocean floor. In the particular embodiment illustrated in FIGURE 2, a well casinghead 24 is secured to the center of the base member 20 with a conductor pipe 25 extending downwardly therefrom in coaxial alignment with the casinghead 24.

The guide columns 21, 22 and 23 are preferably flared at their upper ends to form cone-shaped flanges 26, 27 and 28. The guide columns 21, 22 and 23 are tubular and are provided with a longitudinal slot 30 or 31 extending downwardly from the open upper end thereof to a distance sufficient to allow equipment to be lowered onto the casinghead 24.

Extending upwardly from each of the guide columns 21, 22 and 23 is a guide cable 32, 33 or 34 which is normally centrally located within the guide column and is preferably of a diameter slightly larger than the slots 30 and 31 of the guide columns or is equipped with spools or thimbles so that the cables cannot come out of the slots. The lower ends of the cables 32, 33 and 34 are releasably anchored in the guide columns 21, 22 and 23, preferably near the lower ends thereof. A hold-down shoe 35 is preferably provided in and fixedly secured to the inner surface of each guide column 21, 22 and 23 for anchoring a latching mechanism 36, attached to the lower end of the cable 32, for securing it therein. A weight bar 37 may be positioned above the latching mechanism 36.

In FIGURE 2 the rectangular box 38 represents any piece of equipment being lowered into place, as by means of a pipe string 40 which would extend to the drilling barge 11 on the surface of the water. The piece of equipment 38 is provided with two or more guide arms 41 and 42 with guide cones 43 and 44 being attached to the outer ends thereof, preferably by swivel joints to facilitate aligning. The guide cones 43 and 44 are of a diameter slightly less than the inner diameter of the guide columns 21 and 23 and preferably have lower ends that taper downwardly. The cone-shaped flanges 26 and 28 at the top of the guide columns 21 and 23 serve to align the guide cones 43 and 44 as they move downwardly into the guide columns or tubes. Each of the guide cones 43 and 44 is provided with a vertical hole therethrough of a diameter slightly larger than the guide cables 32 and 34, thus allowing the guide cones to pass freely down the cables and rest within their respective guide columns 21 and 23. The slot 31 in each guide column 22 is positioned normally in line with the axis of the casinghead 24. Generally, the guide columns 21, 22 and 23 are equally spaced from each other and equally spaced from a vertical line taken through the center casinghead 24. The latching mechanism 36 at the lower end of the guide cable 32 is shown as being provided with a pair of outwardly-extendible latching dogs 46 and 47 which are designed to engage the hold-down shoe 35 in the guide column 21.

One form of a latching mechanism is shown in greater detail in its normally-operative position in FIGURE 3. The body member 36 of the latching mechanism contains a mandrel 48 centrally mounted therein and extending to a position adjacent the latching dogs 46 and 47. A blocking surface 49 is formed on the mandrel 48 at a point adjacent the latching dogs 46 and 47 so as to normally bear against the latching dogs when the latching dogs 46 and 47 are in their outwardly-extended or latching position, as illustrated. The blocking surface 49 of the mandrel 48 prevents the latching dogs 46 and 47 from rotating downwardly about their pivot pins 51 and 52 to an inoperative position. The shape of the latching dogs 46 and 47 permits them to pivot upwardly on their pins 51 and 52 to a retracted position within recesses 53 and 54 formed within the body member 36 of the latching mechanism. The upper end of the mandrel 48 extends upwardly through the top of the body 36 of the latching mechanism and is provided with any suitable type of connector or cable socket 55 by which the guide cable 32 may be connected.

At some point below the blocking surface 49 of the mandrel 48, suitable means are provided for normally securing the lower end of the mandrel in a fixed manner to the body 36 of the latching mechanism. Although the lower end of the mandrel 48 may be fixedly secured to the body 36 by screw threads, it is preferably provided with a seating surface 56 adapted to engage a landing surface 57 formed by a ring element 57a within the lower end of the body member 36. At one point below the blocking surface 49 of the mandrel 48 and above the seating surface 56 thereof, the mandrel is reduced in diameter or otherwise weakened to form a shearable portion of the mandrel which is designed to shear under a load less than the shear strength of the cable 32 attached to the top of the mandrel 48. The lower end of the body member 36 is preferably closed by a screw threaded closure member 60 which is preferably tapered downwardly.

Although the latching dogs 46 and 47 may be designed with a shape, or weighted in a manner, so that the force of gravity causes the dogs to assume their horizontally-extended position, as illustrated in FIGURE 3; the latching mechanism is preferably provided with suitable actuating means in contact with the latching dogs 46 and 47 for normally urging the latching dogs from the recesses 53 and 54 of the body member 36. One suitable form of an actuating means of the latching dogs 46 and 47 is a compression spring 61 concentrically mounted about the mandrel 48 for urging a follower ring 62 downwardly against the upper edge of the latching dogs 46 and 47.

If desired, a latching mechanism having a diameter substantially equal to that of the interior of the guide column 21 may be employed as shown in FIGURE 3. In this embodiment of the invention the wall of the guide column 21 is provided with a pair of latching slots 70 and 71 in which the latching dogs 46 and 47 may seat, with a guide ridge 72 being provided on the inside of the guide column 21 for guiding the dogs 46 and 47 into place within the slots 70 and 71.

In the operation of a preferred embodiment of the present invention illustrated in FIGURE 2, the cables 32, 33 and 34 are originally latched in the guide columns 21, 22 and 23 preferably before the guide assembly base 18 is lowered into and through the water to the ocean floor. As the latching mechanism 36 (FIGURE 2) passes through the lock-down shoe 35 in the bottom of the guide column 21, the spring-loaded latching dogs 46 and 47 are forced into the body of the latching mechanism 36 temporarily, and they immediately expand radially outwardly when they have passed the bottom of the lock-down shoe 35. The tensile load on the guide line 32 is transferred to these latching dogs 46 and 47 through the mandrel 48 locked to the body member 36 and thence through the pivot pins 51 and 52 to the latching dogs 46 and 47. So long as tension is maintained on the cable or guide line 32, the latching mechanism 36 remains locked in the bottom of the lock-down shoe 35 (FIGURE 2) or in the slots 70 and 71 (FIGURE 3), thus firmly anchoring the lower end of the cable 32 within the guide column 21.

The body member 36 and the mandrel 48 are provided with cooperating stop elements in the form of shoulders 73 and 74 on the body member 36 and the mandrel 48, respectively. During normal operations, with the guide cables in place as illustrated in FIGURE 2, the upper ends of the guide cables 32, 33 and 34 are preferably connected to constant tension air winches 76, 77 and 78 mounted on the barge 11.

When it is desired to retrieve the guide cables 32, 33 and 34 from the guide assembly base 18, tension is increased on each guide cable and thence on the mandrel 48 of the latching mechanism until the shearable portion 59 of the mandrel is fractured allowing the mandrel 48 to be pulled upwardly by the cable until the shoulder 74 on the outside of the mandrel 48 engages the cooperating shoulder 73 formed within the bore of the body member 36. At this time the blocking surface 49 of the mandrel 36 is no longer positioned adjacent the latching dogs 46 and 47 thus allowing the dogs 46 and 47 to rotate downwardly into the recesses 53 and 54 of the body member 36 upon a continued pull being applied to the cable 32. The shearable portion 59 of the mandrel 48 is designed and constructed to fail in tension before the guide cable 32 fails. This allows the entire latching mechanism to be recovered by pulling it upwardly to the barge by means of the cable 32. The latching mechanism can be subsequently reused by removing the closure member 60 at the lower end of the body member 36 and inserting a new mandrel 48 in place of the one which was sheared.

This application is a continuation-in-part application of copending U.S. application, Serial No. 43,576, filed July 18, 1960 and which issued on August 21, 1962 as U.S. Patent 3,050,139.

I claim as my invention:

1. Apparatus for latching a cable to a base element having latching shoulder means formed thereon, said apparatus comprising a body member having lateral recesses therein, latching means carried by said body member in said recesses and mounted for lateral extension therefrom, actuating means carried by said body member and in engagement with said latching means for moving said latching means to an operative position, a mandrel longitudinally mounted in said body member adjacent said latching means with one end of said mandrel extending outside said body member, a portion of said mandrel forming a blocking surface normally bearing against said latching means when said latching means are in extended or latching position, said latching means being retractable into said recesses when said blocking surfaces are out of contact with said latching means, means for securing a cable to the end of said mandrel extending outside said body member, said mandrel having a shearable portion reduced in size to shear under a load less than the shear strength of a cable attached to the mandrel, said shearable portion permitting movement of said mandrel on parting of said shearable mandrel portion to a position where the blocking surface thereof is withdrawn from its normal position adjacent said latching means, and means normally fixedly securing the other end of said mandrel to said body member.

2. Apparatus for latching a cable to a base element having latching shoulder means formed thereon, said apparatus comprising a body member, latching means carried by said body member and mounted for lateral extension therefrom, a mandrel longitudinally mounted in said body member adjacent said latching means with one end of said mandrel extending outside said body member, a portion of said mandrel forming a blocking surface normally bearing against said latching means when said latching means are in extended or latching position, means for securing a cable to the end of said mandrel extending outside said body member, said mandrel having a shearable portion reduced in size to shear under a load less than the shear strength of a cable attached to the mandrel, means normally fixedly securing the other end of said mandrel to said body member, and cooperating stop means on adjacent surfaces of said mandrel and said body member permitting limited movement of said mandrel on parting of said shearable mandrel portion to a position where the blocking surface thereof is withdrawn from its normal position adjacent said latching means.

3. Apparatus for latching a cable to a base element having latching shoulder means formed thereon, said apparatus comprising a body member, latching means carried by said body member in recess means thereof and pivotally mounted for lateral extension therefrom, spring means carried by said body member and contacting said latching means for normally urging said latching means from said recess means of said body member, a mandrel longitudinally mounted in said body member adjacent said latching means with one end of said mandrel extending outside said body member, a portion of said mandrel forming a blocking surface normally bearing against said latching means when said latching means are in the laterally-extended position, means for securing a cable to the end of said mandrel extending outside said body member, said mandrel having a shearable portion reduced in size to shear under a load less than the shear strength of a cable attached to the mandrel, means normally fixedly securing the other end of said mandrel inside said body member, and cooperating stop means adjacent surfaces of said mandrel and said body member permitting limited movement of said mandrel on parting of said shearable mandrel portion to a position where the blocking surface thereof is withdrawn from its normal position adjacent said latching means.

References Cited in the file of this patent
UNITED STATES PATENTS
3,050,139    Hayes _____ Aug. 21, 1962